Feb. 12, 1952 — J. W. CROWNOVER ET AL — 2,585,631
VERNIER MEASURING DEVICE
Filed July 16, 1946 — 3 Sheets-Sheet 1
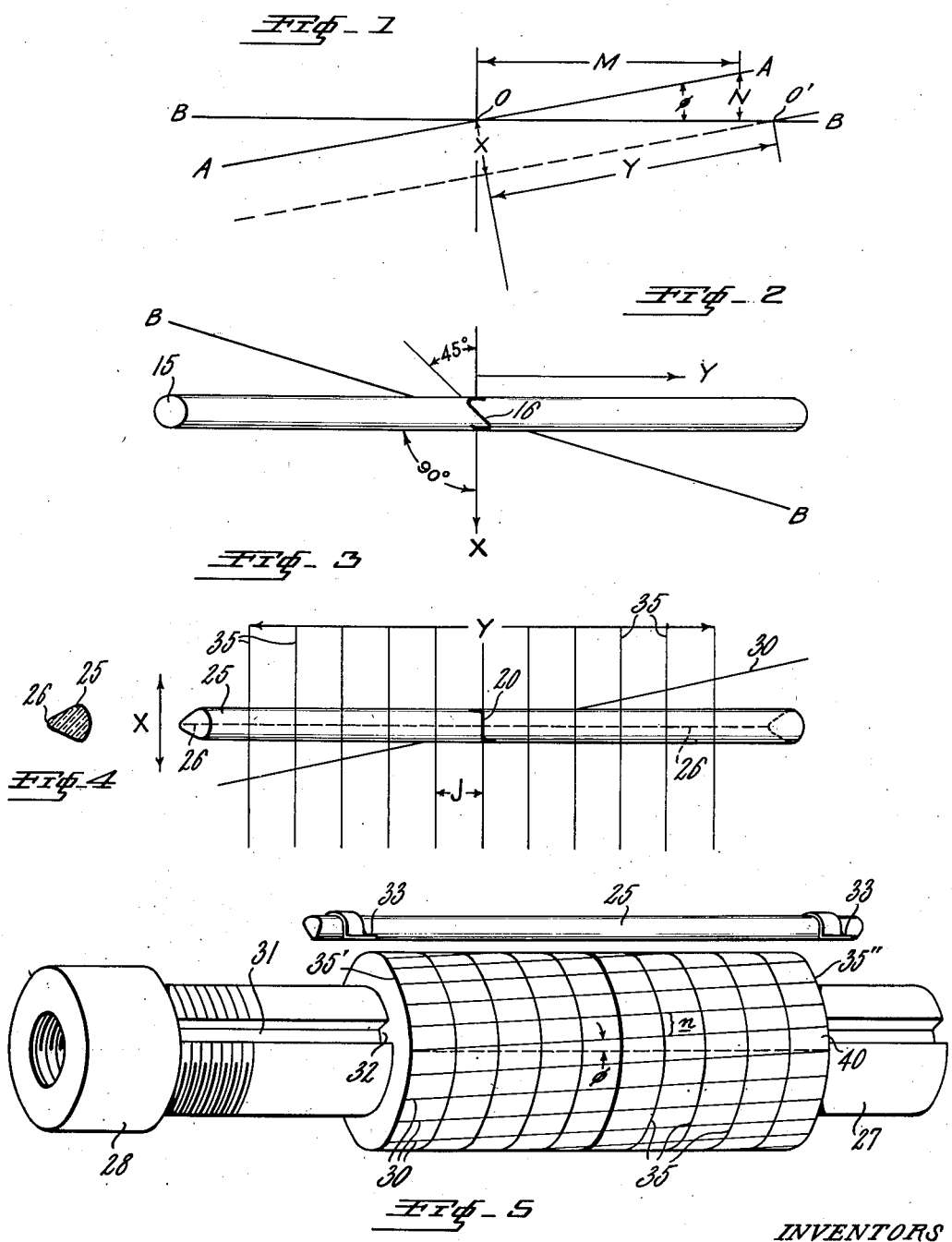
INVENTORS
JOSEPH W. CROWNOVER
JULIUS SCHMIDT
BY
Richard A. Marsen
ATTORNEY

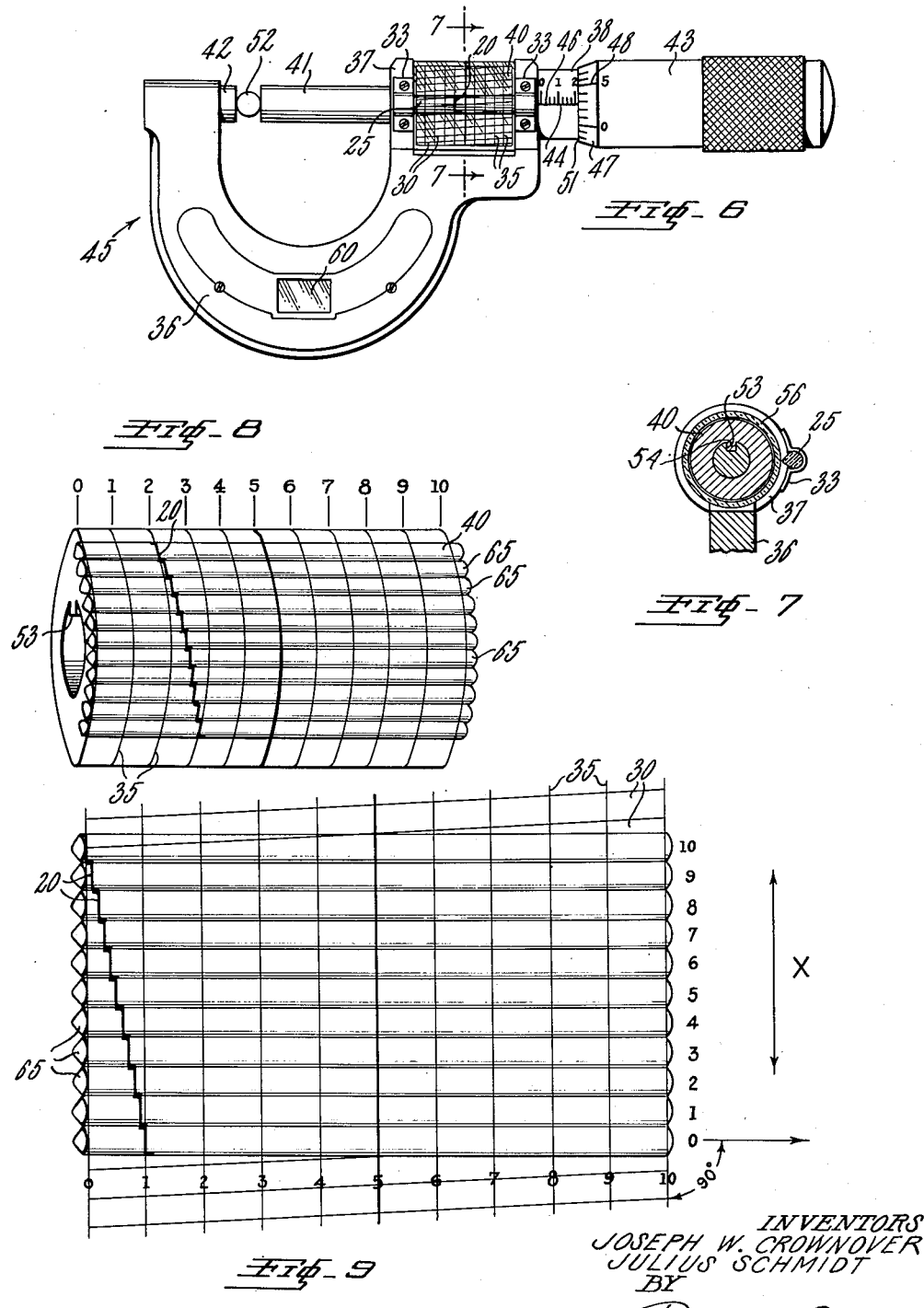

Feb. 12, 1952 J. W. CROWNOVER ET AL 2,585,631
VERNIER MEASURING DEVICE
Filed July 16, 1946 3 Sheets-Sheet 3
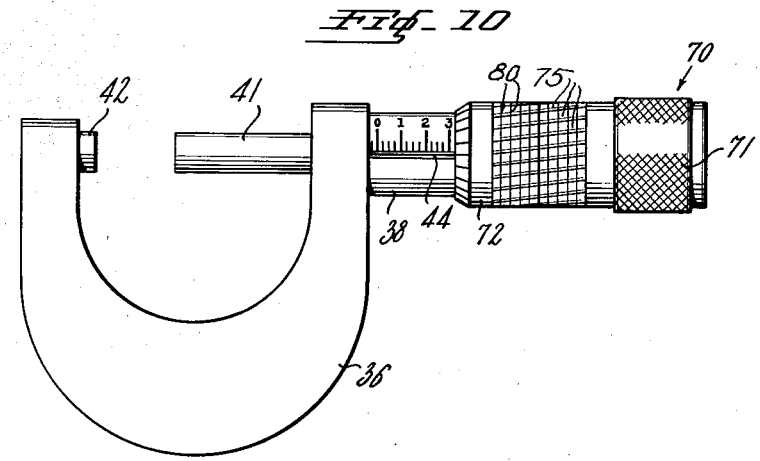
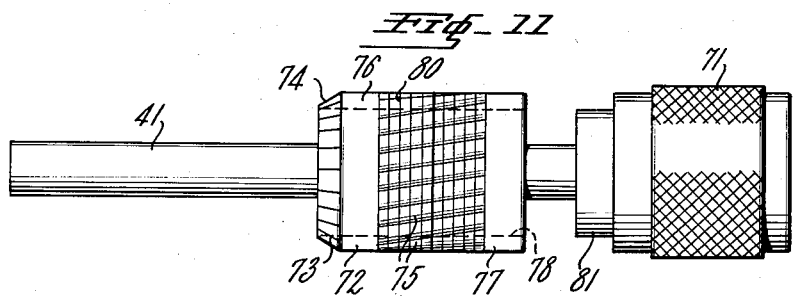
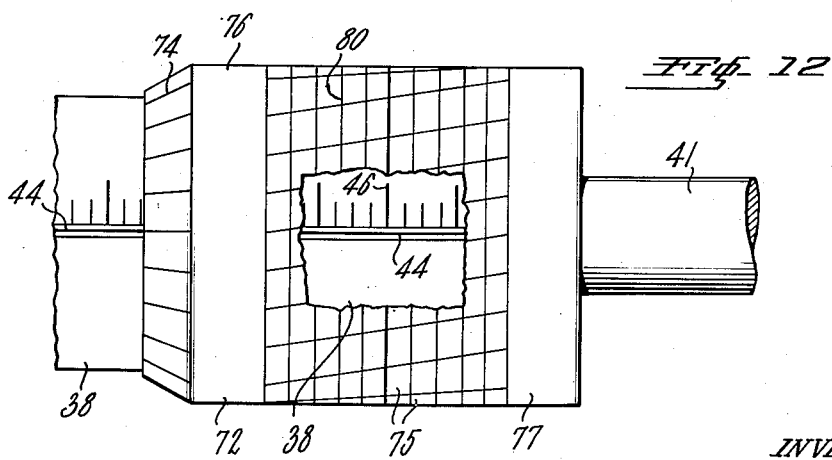
INVENTORS
JOSEPH W. CROWNOVER
JULIUS SCHMIDT
BY
*Richard A. Mansen*
ATTORNEY Patented Feb. 12, 1952

2,585,631

UNITED STATES PATENT OFFICE 2,585,631

VERNIER MEASURING DEVICE

Joseph W. Crownover, Hartsdale, and
Julius Schmidt, Ardsley, N. Y.

Application January 16, 1946, Serial No. 641,570

5 Claims. (Cl. 33—166)

This invention relates to measuring devices and more particularly to a novel vernier measuring device of greatly increased accuracy.

Various type of vernier arrangements have been suggested for incorporation in accurate measuring devices, such as micrometer calipers. In the ordinary micrometer caliper capable of reading to .001 inch, a reading of .0001 inch may be roughly approximated by noting the position of the index line on the barrel relative to two division lines on the beveled edge customarily provided on the thimble. Other types of micrometers readable to .0001 inch have been provided in which two thimbles are used. However, this type of micrometer involves the adjustment of two elements with the consequent chance of human error in making the observation.

It is among the objects of the present invention to provide a novel vernier arrangement for accurate measuring devices; to provide a novel vernier measuring arrangement incorporable in a measuring device and effective to provide accurate readings of higher order of the values than the normal vernier readings thereof; to provide novel vernier arrangements easily incorporated in a standard micrometer caliper to increase the accuracy and fineness to which the micrometer caliper may be read; to provide novel vernier measuring arrangements operating on a new principle; and to provide a simple, effective, novel and accurate vernier measuring arrangement usable with any type of scaling or measuring device.

This and other objects, advantages and novel features of the invention will be apparent from the following description and the accompanying drawings. In the drawings:

Fig. 1 is a diagram used in illustrating the principles of the present invention.

Fig. 2 is a diagrammatic view illustrating the principles of the invention.

Fig. 3 is a plan view of a vernier measuring arrangement according to the present invention.

Fig. 4 is an end elevation view of the optical index used in the arrangement shown in Fig. 3.

Fig. 5 is a perspective view of one embodiment of the present invention as incorporated in a rotating scale measuring device.

Fig. 6 is an elevation view of a micrometer calipers incorporating the present invention.

Fig. 7 is a cross-sectional view on the line 7—7 of Fig. 6.

Fig. 8 is a perspective view of a micro-vernier arrangement adaptable to the micrometer calipers shown in Fig. 6.

Fig. 9 is a developed view of the micro-vernier arrangement shown in Fig. 8.

Fig. 10 is an elevation view illustrating another form in which the invention may be embodied in a micrometer calipers.

Fig. 11 is an elevation view showing constructional features of the micrometer calipers shown in Fig. 10.

Fig. 12 is an enlarged elevational view, partly broken away, illustrating further constructional features of the micrometer calipers shown in Fig. 10.

The underlying principle of the present invention is that of the relative movement of a pair of linear elements intersecting at a relatively small angle. When one of such elements is moved in a direction perpendicular to its length relative to the other element, the movement of the point of intersection of the elements along the relatively stationary element will afford an amplified indication of the movement of a point on the movable element in a direction perpendicular to the relatively stationary element. In a practical embodiment of this principle, an elongated optical index, such as a substantially cylindrical transparent rod of glass or plastic, is moved perpendicularly to its length with respect to one or more parallel division lines intersecting the center line of the index at a small angle. As the index passes over successive division lines, the images of such lines will move sequentially longitudinally of the index. By noting the position of such images relative to parallel scale lines extending perpendicularly to the index, the movement of the index along such scale lines may be accurately gauged.

The principle is equally applicable whether a single optical index is moved relatively to a plurality of angularly directed, parallel division lines or whether a plurality of such optical indices are arranged for relative movement with respect to a single division line angularly intersecting the center line of the indices. By suitable adaptation of the cross-section of the optical indices, the images of the division lines may be made to assume a configuration such that they can be accurately aligned with the above mentioned scale lines.

The basic principle of the invention is illustrated in Fig. 1, which shows a pair of lines A—A and B—B intersecting at O at a small angle $\phi$. If line A—A is moved perpendicularly to its length by an amount X, the point of intersection of the two lines will move along line A—A by the distance Y, to the point O'. The distance Y, that the point of intersection O will have moved, is given by the following formula:

$$Y = X\frac{M}{N} = X \text{ cotangent } \phi$$

The ratio M/N, which is the cotangent of angle $\phi$, is the amplification factor.

If, as shown in Fig. 2, line or linear element A—A is replaced by cylindrical transparent rod 15, intersecting line B—B at an angle, the image 16 of line B—B, as seen through the transparent rod 15, will be extremely distorted, appearing as a tall and narrow S lying at an angle of about 45° to the axis of rod 15. As rod 15 is moved in the direction X perpendicular to its axis, image 16 of line B—B will move along the axis of rod 15 in the direction Y. The distance that image 16 moves along rod 15 in the direction Y will bear a ratio to the distance X equal to the amplification factor, discussed in connection with Fig. 1, which is the cotangent of the angle of intersection of rod 15 with line B—B.

By altering the cross-sectional shape of rod 15 to substantially the form of rod 25, as shown in Figs. 3 and 4, the distorted image 20 of a division line 30, corresponding to image 16 of line B—B in Fig. 2, will appear to include practically a straight line or mark extending perpendicularly across rod 25. A preferred shape for rod 25 is one having a generally segmental cross-section with a rounded apex, as shown more particularly in Fig. 4. Such shape, however, is not a true segment of a circle as the curved portion of the surface has a radius considerably shorter than the depth of the rod. Rod 25 is inclined by $\phi$ degrees to line 30. In this instance, if rod 25 is moved perpendicularly to its length by a distance X, image 20 will move in the direction Y by a distance equal to X cotangent $\phi$. If the amplification factor, cotangent $\phi$, is made equal to 10, the distance moved along Y will be equal to 10X. An amplification factor of 10 is useful in most types of vernier measuring arrangements based on the decimal system, and is used in the preferred embodiment.

If now eleven scale lines 35 are drawn parallel to each other and to the direction X, and divide the distance Y into 10 equal spaces J, a suitable scale system of 10 spaces will be provided. If rod 25 is now moved in the direction X a distance equal to 0.1×J, image 20 will move in the Y direction by distance equal to J. It is desirable that an index line 26 be etched or placed in some suitable manner on the surface of rod 25 closest to the plane of the scale including division line 30 and scale lines 35, in order to accurately gauge the position of index 20 with respect to scale lines 35.

Fig. 5 illustrates the invention as incorporated in a measuring device having a rotary scale, effective to indicate the longitudinal movement of a threaded member rotatable with the scale. Spindle 27 has a threaded end engaged in a relatively fixed nut 28. A keyway 31 extends longitudinally of spindle 27, and is engaged by a key 32 on the inner surface of cylindrical drum 40. Scale lines 35 extend circumferentially around drum 40, and the plane of the scale lines is perpendicular to the axis of spindle 27 and drum 40. Division lines 30 extend obliquely along the surface of drum 40 making an angle $\phi$ with the axis of the drum. The distance $n$ along any scale line 35 between a pair of division lines 30, is equal to the distance between the outer scale lines, 35' to 35'', multiplied by the tangent of the angle $\phi$ between the division lines 30 and the drum axis. Rod 25 is mounted in a fixed position by a pair of suitable clamps 33, 33.

There are eleven of the scale lines 35, dividing the length of drum 40 into 10 equal divisions. The number of the division lines 30 may be correlated with the divisions of a main scale of which the arrangement shown in Fig. 5 constitutes a vernier scale. For instance, if each unit of the main scale is divided into 25 divisions for a single turn of spindle 27 (as on the thimble of a micrometer-calipers), there could be 25 division lines on drum 40. The diameter of drum 40 is so related to its length that an integral spacing $n$ between division lines 30 is provided when the outer surface of the drum is divided into 25 equal spaces. This is a preferred number of divisions when the present invention is incorporated in a micrometer calipers, and when 10 spaces between scale lines 35 are provided. The angle of division lines 30 with respect to the axis of drum 40 is so chosen that an amplification factor of 10 is provided. For this purpose, the angle $\phi$ is preferably 5°–42'–38'', the cotangent of which angle is approximately 10.00.

As the drum 40 is rotated relative to rod 25, images of division lines 30 will appear to move successively along rod 25. By observing the position of the image of any division line 30 in rod 25, with respect to scale lines 35, the amount of turning movement of spindle 27 intermediate division lines 30 can be determined. In other words, the arrangement accurately indicates one-tenth of the length of a division line, which can thus be read as 0.1 of a division of the main scale with which the arrangement shown in Fig. 5 is associated. As stated, the angle $\phi$ between division lines 30 is such that a line parallel to the axis of drum 40 will connect one end of one division line to the opposite end of an adjacent division line. Accordingly, the image of only one division line 30 will appear in rod 25 at one time. This image will move progressively along the horizontal length of rod 25 as drum 40 is turned. The position of the image in rod 25 is read with respect to scale lines 35. Thus, for movement of drum 40 an amount such that a point on its periphery is advanced by the distance between any two division lines 30 as measured along a scale line 35, the image of a division line will move along rod 25 a distance equal to 10 of the divisions between scale lines 35. Thus a reading 0.1 of such movement of drum 40 may be obtained by noting the position of the image in rod 25 with reference to the scale lines 35. Furthermore, a reading of 0.01 of such movement can be estimated by observing the position of the image between a pair of scale lines with relation to its distance from either scale line.

In a micrometer, for example, in which such turning movement of an amount equal to $\frac{1}{25}$ of the total movement of the drum advances the spindle by 0.001 inch, the position of the image in rod 25 with reference to scale lines 35 will give an accurate reading to 0.0001. Movement of the spindle as little as 0.00001 inch can be estimated by reference to the position of the image with relation to a pair of scale lines on either side of the image.

The arrangement shown in Fig. 5 can readily be incorporated in a micrometer calipers as shown in Figs. 6 and 7. In accordance with customary construction, the micrometer calipers 45 is provided with a frame 36 having a trunnion 37 from which extends barrel 38. As usual in such constructions, an accurately threaded spindle 41 is threadedly engaged in barrel 38 for longitudinal movement with respect to an abutment 42. To measure a sample 52, spindle 41 is rotated until the sample is engaged between the end of the spindle and abutment 42. A thimble 43 is secured to rotate with spindle 41. Barrel 38 is provided with an index line 44 divided into equal divisions by indicia 46. Each division customarily represents .025 inch, and every fourth division mark is elongated to indicate 0.1 inch. Likewise the inner end of thimble 43 is provided with a beveled edge 47 around which are marked 25 indicia 48. Normally, one rotation of thimble 43 and spindle 41 advances the inner edge 51 of the thimble the distance between two indicia 46 as measured along index line 44. With the described arrangement, movement of spindle 41 to grip a sample 52 between itself and abutment 42 will give an indication of the diameter or thickness of the sample directly in the order of one-thousandth of an inch.

In accordance with the present invention, trunnion 37 is cut away to receive a cylindrical drum 49 provided with division lines 30 extending longitudinally of the drum at an angle $\phi$ to the axis thereof, and also with scale lines 35 extending circumferentially of the drum. The preferred value of angle $\phi$ is 5°42′38″, which angle has a cotangent of 10.00 thus giving an amplification factor of 10. The drum is enclosed within a transparent cylindrical window 56, and rod 25 is secured to trunnion 37 by clamps 33. Drum 49 has a key 53 engaging in a keyway 54 of spindle 41, and is thus rotatable with the spindle but held against longitudinal movement. Frame 36 is provided with an opening receiving a suitable strain gauge 69 in order that measurements of sample 52 may be taken to the required degree of accuracy without such accuracy being effected by distortion of frame 45.

Eleven scale lines 35 are provided dividing the length of drum 49 into ten equal divisions. For easy reading, the center scale line 35 is desirably made heavier than the other scale lines. This facilitates visual observation of the reading of the micrometer to .0001 inch. Twenty-five division lines 30 are provided, corresponding to the twenty-five indicia 48 on spindle 43. Thereby as spindle 43 is rotated, the image 20 of successive division lines appears to travel along rod 25 with reference to scale lines 35. The scale lines 35 thus accurately divide each of the divisions between indicia 48 into ten parts. Accordingly, the micrometer may be read directly to ten-thousandths of an inch.

A further vernier arrangement is provided whereby the micrometer may be read by the present invention directly to one-hundred-thousandths of an inch. For this purpose, and as shown diagrammatically in Fig. 8, a series of transparent rods 65 are secured to trunnion 37 overlying scale 40. In the arrangement shown in Figs. 8 and 9, eleven of these rods 65 are arranged in parallel juxtaposition, with a distance between the center lines of the first and eleventh rods being equal to the distance between 11 division lines (30) as measured along any scale line 35 minus a small distance which is equal to the product of the distance between scale lines multiplied by the tangent of the angle $\phi$. This arrangement provides a vernier reading, in which the coincidence of any of the images 20 (Figs. 8 and 9) with a particular scale line will provide a reading equal to the tenth part of the reading provided by the main rod 25. As will be noted, the images 20 are spaced apart along rods 65 one-tenth of the distance between any two scale lines 35. In the particular position shown in Figs. 8 and 9, the "0" and "10" images are aligned with scale lines "2" and "3." The images form a diagonal extending between the "0" and "10" rods. The arrangement will be clear from Fig. 9, which is a developed view of the micrometer-vernier arrangement of Fig. 8.

By noting the number of the scale line with which an image coincides, it is possible to obtain a vernier reading of $\frac{1}{10}$ of the value of the reading obtained by observing the image in rod 25 with respect to scale lines 35. As the image 20 in rod 25 provides a reading of the micrometer calipers to 0.0001 inch, the reading obtained by noting the coincidence of an image in rods 65 with one of the numbered scale lines 35 will thus enable the micrometer to be read accurately to .00001 inch.

Figs. 10, 11 and 12 illustrate an alternative micrometer arrangement in which the vernier measuring device of the invention is incorporated in the thimble of the micrometer. In these figures, parts identical with those in Figs. 6 and 7 have been given the same reference numerals.

Thimble 70 is formed as a two-part element including a rear thumbscrew portion and a micro-vernier dial portion 72. Dial portion 72 has a bevelled edge carrying indicia 74 corresponding to indicia 48 of the micrometer of Figs. 6 and 7. Portion 72 comprises a forward cylindrical member 76 and a rear member 77 having a cylindrical recess 78 adapted to receive a cylindrical boss 81 on thumbscrew portion 71. Between portions 76 and 77, twenty-five transparent rods 75 are disposed in parallel relation to each other and extending at an acute angle $\phi$ in respect to the axis of the spindle 41. Rods 75 extend completely around the periphery of dial portion 72. Scale lines 80 in this instance are etched on the surface rods 75 and extend as continuous lines completely around portion 72 in planes perpendicular to the axis of spindle 41.

As will be understood by those skilled in the art, index line 44 of the micrometer is continued along barrel 38 to its ends, as well as indicia 46. The index line will thus underly rods 75 throughout the length of the rod assembly, as shown more particularly in Fig. 12 which is broken away to illustrate index line 44 and indicia 46 beneath rods 75.

In operation, images of index line 44 are formed in transparent rods 75 and move longitudinally of such rods as the thimble is rotated. By observing the position of index line 44 with respect to scale lines 80, a vernier reading of the micrometer may be obtained. A micro-vernier arrangement similar to that described in connection with Figs. 8 and 9 may likewise be incorporated in this embodiment of the invention. Index line 44 comprises a white plastic inlay having a small diameter dark wire embedded in its surface so as to be plainly visible through rods 75 and yet not be susceptible to rubbing off.

As an alternative arrangement, rods 75 can be placed parallel to the axis of the micrometer spindle 41, and an additional index line can be provided on the spindle extending at an angle $\phi$ to the index line 44. The angle $\phi$ in this instance has a value such that its cotangent is equal to 10. As will be understood, this arrangement provides the necessary angular relation of an index line with a scale line and the optical indexes to obtain the vernier reading according to the same principles as in the other embodiments of the invention.

The present invention comprises relatively simple, accurate vernier measuring arrangements of general utility. The arrangements are particularly adaptable to measuring devices having rotatable scales. While the invention has been described more particularly as applied to a micrometer calipers, it will be understood that this description is exemplary only and that the invention is equally applicable to measuring arrangement of other types, and irrespective of whether their scales are rotary or otherwise movable.

While specific embodiments of the invention have been described in detail to illustrate the application of the principles thereof, it will be understood that the invention may be otherwise embodied without departing from such principles.

What is claimed is:

1. A vernier micrometer comprising, in combination, a frame having a trunnion; a sleeve mounted in said trunnion and having an index line and indicia therealong; a spindle threaded in said sleeve and extending through said trunnion; a thimble secured to said spindle and having indicia extending around its circumference and cooperable with said index line; said trunnion having a cutaway portion; a cylindrical scale secured to rotate with said spindle and mounted in such cutaway portion; a series of parallel equi-spaced scale lines extending circumferentially of said scale, the planes of said scale lines being perpendicular to the axis of said scale, and said scale lines dividing the length of said scale into ten equal divisions; a plurality of parallel, equi-spaced division lines extending longitudinally of said scale, intersecting and non-perpendicular to said scale lines and extending at the same small acute angle to a perpendicular to the scale lines, the number of said division lines being equal to the number of indicia on said thimble and said division lines dividing the surface of said scale into equal divisions; the intersection of one end of any division line with the first scale line being connectible to the intersection of the opposite end of the next adjacent division line with the last scale line by a perpendicular to the scale line and a transparent rod secured to said trunnion overlying said scale and parallel to the axis thereof, said rod having a generally segmental cross-section with the arcuate outer surface having a radius of curvature substantially less than that normally corresponding to the segment and the inner edge of the segment being arcuate so that an intersected portion of a division line appears through the rod as an offset S; whereby, as said spindle is rotated, the images of said division line will appear to travel longitudinally of said rod relative to said scale lines so that a vernier reading of said micrometer, with respect to the indicia on said thimble, may be obtained.

2. A vernier measuring device comprising, in combination, a first series of parallel equi-spaced linear elements; a second series of parallel equi-spaced linear elements, each intersecting the elements of said first series and each extending at the same small acute angle to a perpendicular to the elements of said first series; the intersection of one end of any element of the second series with the first element of said first series being connectible to the intersection of the opposite end of the next adjacent element of the second series with the last element of said first series by a perpendicular to the elements of said first series; all of said elements lying in a common surface; and an elongated linear index extending perpendicularly to the elements of said first series and relatively movable with respect to the elements of said second series, in a direction perpendicular to itself and parallel to the elements of said first series; said index immediately overlying all of said elements; whereby the point of intersection of said index with an element of said second series will be a measure of such relative movement of said index parallel to the elements of said first series; said elongated index comprising a rod of transparent material having curved surface portions whereby the intersected portion of an element of said second series appears through the rod as a distorted S.

3. A vernier measuring device comprising, in combination, a first series of parallel equi-spaced linear elements; a second series of parallel equi-spaced linear elements, each intersecting the elements of said first series and each extending at the same small acute angle to a perpendicular to the elements of said first series; the intersection of one end of any element of the second series with the first element of said first series being connectible to the intersection of the opposite end of the next adjacent element of the second series with the last element of said first series by a perpendicular to the elements of said first series; all of said elements lying in a common surface; and an elongated linear index extending perpendicularly to the elements of said first series and relatively movable with respect to the elements of said second series, in a direction perpendicular to itself and parallel to the elements of said first series; said index immediately overlying all of said elements; whereby the point of intersection of said index with an element of said second series will be a measure of such relative movement of said index parallel to the elements of said first series; said elongated index comprising a rod of transparent material having a generally segmental cross-section with the arcuate outer surface having a radius of curvature substantially less than that normally corresponding to the segment and the narrow end of the segment being also arcuate, whereby the intersected portion of an element of said second series appears through the rod as an offset S.

4. A vernier measuring device comprising, in combination, a scale; a series of parallel equi-spaced scale lines extending transversely of said scale and dividing the scale into equal divisions longitudinally; a series of parallel equi-spaced division lines extending longitudinally of said scale and dividing the scale into equal divisions transversely, each division line intersecting the scale lines and extending at the same small acute angle to a perpendicular to the scale lines; the intersection of one end of any division line with the first scale line being connectible to the intersection of the opposite end of the next adjacent division line with the last scale line by a perpendicular to the scale lines; and an elongated linear index extending perpendicularly to the scale lines relatively movable with respect to the division lines, in a direction perpendicular to itself and parallel to the scale line, said index being superposed on the scale surface; whereby the point of intersection of said index with division line will be a measure of such relative movement of said index parallel to the scale lines; the spacing between the intersections of adjacent division lines with the same scale line being equal to the distance between the first and last scale lines multiplied by the tangent of such angle, and said elongated index comprising a rod of transparent material having curved surface portions whereby the intersected portion of a division line appears through the rod as a distorted S.

5. A vernier measuring device comprising, in combination, a scale; a series of parallel equi-spaced scale lines extending transversely of said scale and dividing the scale into equal divisions longitudinally; a series of parallel equi-spaced division lines extending longitudinally of said scale and dividing the scale into equal divisions transversely, each division line intersecting the scale lines and extending at the same small acute angle to a perpendicular to the scale lines; the intersection of one end of any division line with the first scale line being connectible to the intersection of the opposite end of the next adjacent division line with the last scale line by a perpendicular to the scale lines; and an elongated linear index extending perpendicularly to the scale lines relatively movable with respect to the division lines, in a direction perpendicular to itself and parallel to the scale lines, said index being superposed on the scale surface; whereby the point of intersection of said index with division line will be a measure of such relative movement of said index parallel to the scale lines; the spacing between the intersections of adjacent division lines with the same scale line being equal to the distance between the first and last scale lines multiplied by the tangent of such angle, and said elongated index comprising a rod of transparent material having a generally segmental cross-section with the arcuate outer surface having a radius of curvature substantially less than that normally corresponding to the segment and the narrow end of the segment being also arcuate, whereby the intersected portions of a division line appears through the rod as an offset S.

JOSEPH W. CROWNOVER.
JULIUS SCHMIDT.

REFERENCES CITED

The following references are of record in the file of this patent:

UNITED STATES PATENTS

| Number | Name | Date |
| --- | --- | --- |
| 773,326 | Junken et al. | Oct. 25, 1904 |
| 1,405,017 | Shaw | Jan. 31, 1922 |

FOREIGN PATENTS

| Number | Country | Date |
| --- | --- | --- |
| 23,238 | Great Britain | 1908 |